Dec. 22, 1936.  W. F. ZABRISKIE  2,065,005
MOTOR VEHICLE CHASSIS FRAME
Filed April 4, 1932  2 Sheets-Sheet 1
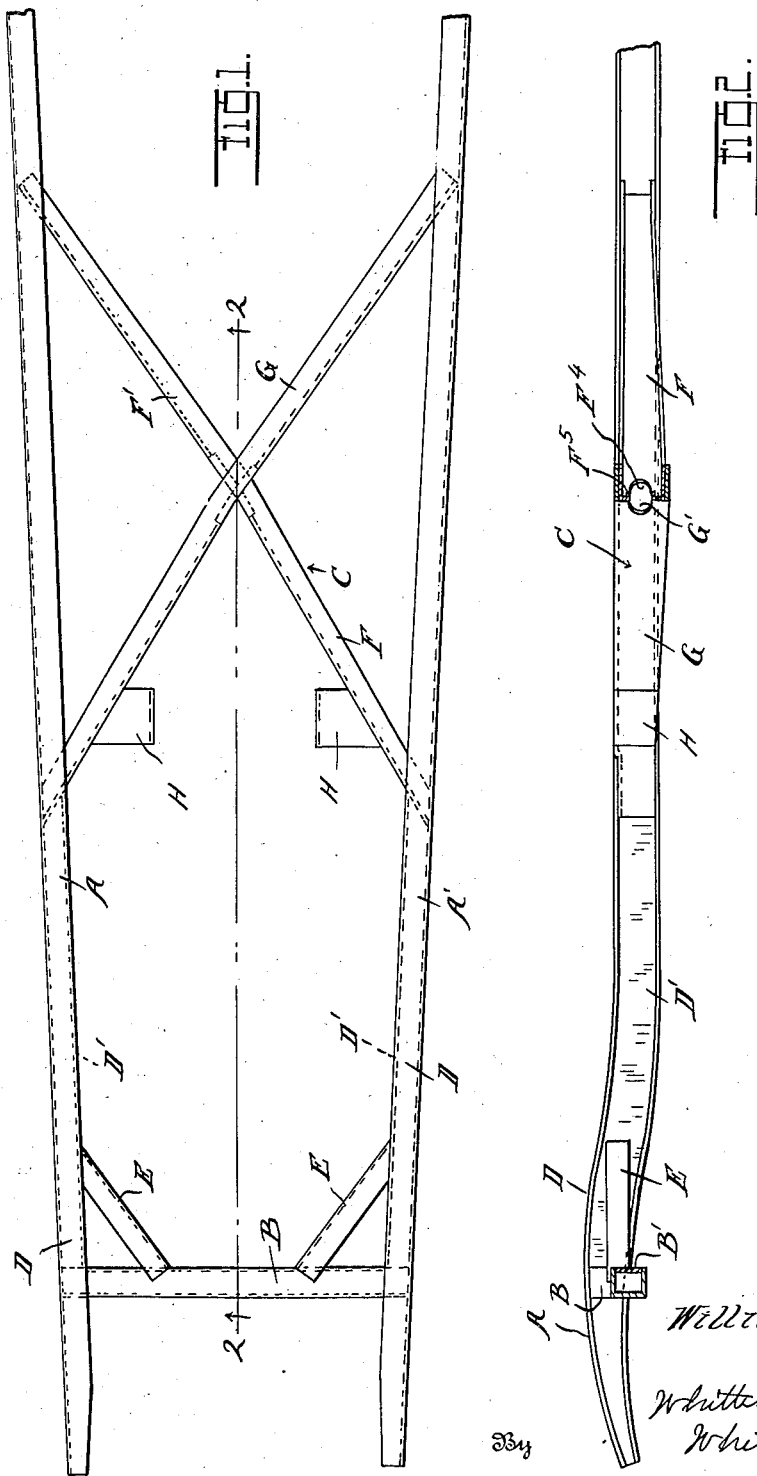

Dec. 22, 1936.  W. F. ZABRISKIE  2,065,005
MOTOR VEHICLE CHASSIS FRAME
Filed April 4, 1932   2 Sheets-Sheet 2
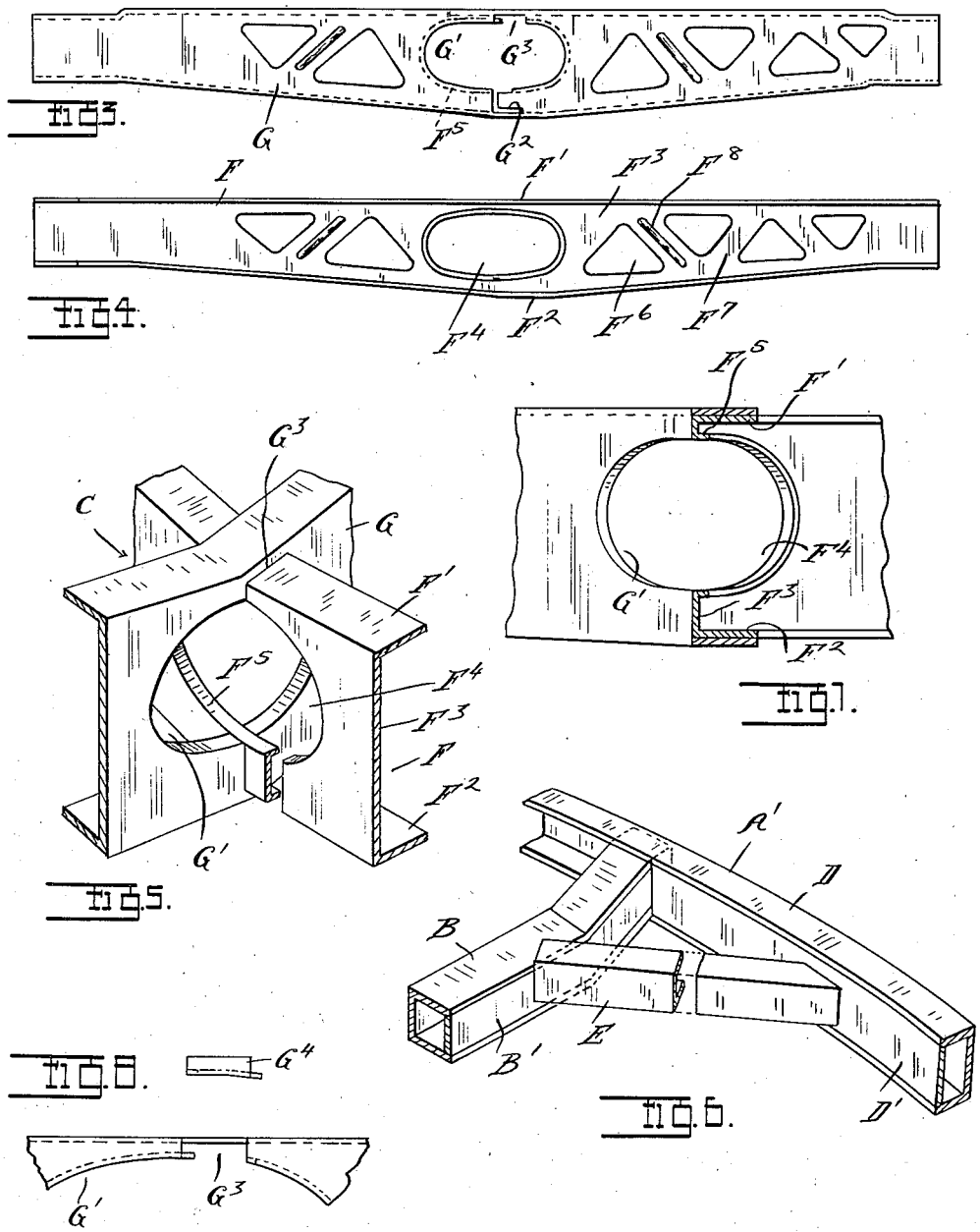

Patented Dec. 22, 1936

2,065,005

UNITED STATES PATENT OFFICE 2,065,005

MOTOR VEHICLE CHASSIS FRAME

William F. Zabriskie, Detroit, Mich., assignor, by mesne assignments, to Chrysler Corporation, Highland Park, Mich., a corporation of Delaware Application April 4, 1932, Serial No. 603,194

9 Claims. (Cl. 280—106)

The invention relates to motor vehicle chassis frames and has for its primary object the obtaining of a construction which, without increase in weight, is more rigid than constructions heretofore used. More particularly it is an object to obtain a construction which is highly resistant to torsional deformation occasioned by the vertical displacement of one end and side of the frame.

In the present state of the art of motor vehicle construction it is customary to yieldably support the motors upon the chassis frame in place of the rigid connections heretofore used. This change in construction has removed from the frame an element contributing a considerable degree of rigidity thereto and it has been found that at high speed operation such frames are subject to objectionable oscillations. This is particularly true where the speed is such that the road shocks synchronize with the natural period of vibration of the frame. Various attempts have been made to correct this defect, such as increase in the depth of the channel side sills and the introduction of an X-shaped cross bracing in the central portion of the frame. However, such changes have been inadequate to secure the desired degree of rigidity.

The present invention is directed to the correction of such defects by a re-design of the frame so that without increase in weight greater rigidity is secured. The invention therefore consists in the peculiar construction, arrangement and combination of elements as hereinafter set forth.

In the drawings:

Figure 1 is a plan view of my improved chassis frame;

Figure 2 is a longitudinal section on line 2—2 of Figure 1;

Figures 3 and 4 are side elevations of the two beams which form the X brace;

Figure 5 is a perspective view of the juncture of these beams;

Figure 6 is a perspective view of a portion of the side sills and front cross member, together with the diagonal brace;

Figure 7 is an enlarged view similar to a portion of Figure 2 showing the intersection of the beams of the X brace, and Figure 8 is an elevation of a portion of one of the beams slotted for the reception of the other beam together with the insert for filling the slot.

As shown in Figure 1, my improved frame has the general form heretofore used comprising continuous side sills A and A' of channel cross section and of the desired contour in side elevation. I have, however, diminished the depth of the web of these channels, thereby reducing weight and also lowering the center of gravity of the vehicle. At the forward end of the frame is a cross brace B and in the central portion of the frame an X-shaped cross member C, as is usual in chassis frame design.

One of the features of my invention is the means for increasing the resistance to torsional deformation of the portion of the side sills intermediate the forward cross brace B and the X brace C. This is accomplished by converting such portions of the side sills into closed box girders and for also forming a closed box cross section in the cross member B. Thus as shown in Figure 6 the cross member B is provided with a vertical plate B' fitting between the horizontal flanges thereof at their outer ends and integrated therewith by electric welding. In the same manner, the portions D of the side sills extending between the cross member B and the X member C are provided with plates D' fitting between the horizontal flanges at the inner ends thereof and integrated thereto by welding. Motor supports are arranged at the forward corners formed by the cross member B and portion D and these are preferably in the form of diagonal braces E of channel cross section having their ends welded respectively to said members B and D. This change from an open channel to a closed box cross section enormously increases the resistance of the members to torsional stresses while the presence of the diagonal braces E imparts further rigidity and reduces the length of the portions in which torsional stress will be developed.

A further feature of my improvement is a modification in the construction of the X brace C. As the central portion of this brace is in the path of the propeller shaft of the vehicle it is necessary to make provision for the passage of said propeller shaft with sufficient clearance for the oscillations thereof incident to road operation. Usually this is accomplished by centrally connecting the diagonal members of the X brace by top and bottom plates, thereby forming an open box through which the propeller shaft may pass. Such construction, however, greatly reduces the efficiency of the X brace as it interrupts the continuity of the diagonal beams extending from one sill to the other. With my improved construction I use continuous beams F and G, these being of channel cross section with the web portions thereof extending in a vertical plane. The depth of the beam G at the center thereof is slightly greater than the depth of the beam F so that the flanges of the latter will fit within the flanges of the beam G. The web of the beam G is then cut away sufficiently for the insertion of the beam F therethrough and also the webs of both beams have elliptical apertures cut therein to provide a passage for the propeller shaft. The beams F and G are then integrated by electric welding. The ends are also electrically welded to the sills A and A'.

More in detail, the beam F is formed with a horizontal top flange F' and a lower flange $F^2$ which inclines upward from center to ends. At the center the web $F^3$ has an elliptical aperture $F^4$ cut therein with a surrounding flange $F^5$. The web of the beam may also be cut away as indicated at $F^6$ to lighten it and to produce intermediate the same diagonal web portions $F^7$. These may also be fashioned to form a longitudinally extending beam $F^8$ for strengthening the same. The beam G is similarly formed with an elliptical opening G' in the web and in addition the web below said aperture is centrally slotted at $G^2$ for the passage of the beam F therethrough. On account of the tapered form of the beam F it would be impossible to pass it through a similar slot at the upper end of the beam G and therefore the web of said beam is notched at $G^3$ to receive the flange F' from the aperture G'. The two beams are then engaged with each other after which a filler $G^4$ is placed in the notch $G^3$ to complete the web and the members are integrated with each other by electric welding around the points of contact. If necessary to avoid interference with other parts of the structure, the beams F and G may be slightly bent at the center to give a different included angle between two arms of the X from that between the opposite two arms, as shown in Figure 1.

With the construction of frame as described, assuming that a force lifts the forward end of one of the sills such as A, this will tend to produce a torsional stress in the cross member B and also a torsional stress in the portion D of said member A. As these parts are each of a closed box cross section they will be highly resistant to deformation from such loading and the diagonal brace E imparts still greater resistance to torsional deformation in both of said members. This same force which lifts the forward end of the sill A will through the beam G of the X member C tend to lift the joint between the beams G and F which in turn will through the beam F tend to lift the sill A'. The efficiency of this X member to perform such function is greatly enhanced if all of the arms of the X meet in a common point, as is the case with my construction. Also the elliptical apertures in the webs of the beams F and G will provide a clear path for the passage of the propeller shaft therethrough. By properly designing and placing the X, the intersection of the beams may be located close to the center of oscillation of the propellor shaft so that comparatively slight clearance is required. Thus the whole construction of the frame is one which adapts it for use in motor vehicles, as it is more rigid, is diminished in weight and also in vertical height, in comparison with structures heretofore used.

As has been stated, the motor supports are mounted upon the diagonal braces E at one end and at the opposite end may be secured by any suitable means such as brackets H secured to the forward arms of the X cross member.

My improved chassis frame not only increases the rigidity without increase in weight but also effects a further saving in weight as it permits of forming a lighter body construction. It has the further advantage of eliminating squeaks and rattles which result from stresses developed in the body where there is lack of rigidity in the frame.

One very important feature of my improved frame is the construction at the intersection of the diagonal members forming the X frame, which members while cut away for the passage of the propeller shaft, have nevertheless a high degree of rigidity. By reason of the fact that the apertures cut in the webs of the diagonal beams are elliptical, an equal clearance is provided on all sides of the propeller shaft and at the same time the remaining portions of the web above and below the aperture form diagonal braces extending substantially to the point of intersection of the beams. These diagonal braces are reinforced by flanges extending continuously around the apertures in the web and contribute very largely to the rigidity of the structure and without in any way interfering with the clearance for oscillation of the propeller shaft.

What I claim as my invention is:

1. In a chassis frame for motor vehicles, the combination with side sills, of an X cross member comprising diagonally crossing beams having vertical webs, one of said beams passing through an aperture in the web of the other of said beams and having the joint integrated by welding, the webs of said beams having apertures therein to form a clearance for the passage of the propeller shaft and being flanged at the margin of said apertures to increase the rigidity at this point.

2. In a chassis frame for motor vehicles, the combination of side sills, of an X cross member therebetween comprising diagonal beams extending to a common point of intersection, the vertical web portions of said beams having elliptical apertures cut therein to form a clearance for the passage of the propeller shaft, the portion of the web at the margin of said elliptical aperture being laterally flanged for increased rigidity and together with the remaining portions of the webs above and below said aperture forming diagonal braces.

3. A chassis frame for motor vehicles comprising a pair of side sills, an X cross member in the central portion of the frame, said X cross member comprising diagonal beams extending substantially to a common point of intersection, portions of the vertical webs of said beams being cut away to form an aperture for the passing and the movement of the propeller shaft, with the remaining portions of said webs at the margin of said aperture forming diagonal braces, said portions of the web at the margin of the aperture being laterally flanged for increased rigidity.

4. A chassis frame for motor vehicles comprising a pair of side sills, a substantially X-shaped brace transversely connecting said side sills and comprising two beams intersecting at substantially the longitudinal vertical mid-plane of the frame, each of said beams having a web and upper and lower flanges extending continuously across said intersection, one of said webs having a greater depth than the other at said intersection and provided with a slot for receiving the beam intersected therewith.

5. A motor vehicle chassis frame comprising a pair of structural members each having upper and lower flanges and a connecting web, one of said webs having an opening for receiving the other structural member for relatively transverse intersection therewith, the flanges of said members being continuous at said intersection.

6. A motor vehicle frame comprising side sills and a connecting substantially X-shaped brace, said brace comprising two intersecting beams each having upper and lower flanges extending continuously between said side sills.

7. A chassis frame for motor vehicles comprising a pair of side sills, a substantially X-shaped structure connecting said side sills together and comprising diagonal beams extending generally to a common point of intersection, each of said beams having upper and lower lateral flanges connected by a vertical web, portions of the webs of said beams being cut away at said intersection to provide an opening for the passage of the vehicle propeller shaft therethrough, one of said beams having its upper and lower flanges continuously bridging said opening at said intersection.

8. A chassis frame for motor vehicles comprising a pair of side sills, a substantially X-shaped structure connecting said side sills together and comprising diagonal beams extending generally to a common point of intersection, each of said beams having upper and lower lateral flanges connected by a vertical web, portions of the webs of said beams being cut away at said intersection to provide an opening for the passage of the vehicle propeller shaft therethrough, each of said beams having its upper and lower flanges continuously bridging said opening at said intersection.

9. A chassis frame for motor vehicles comprising a pair of side sills, a substantially X-shaped structure connecting said side sills together and comprising diagonal beams extending generally to a common point of intersection, each of said beams having a web with portions thereof cut away at said intersection to provide an opening accommodating the vehicle propeller shaft, the web of one of said beams having an L-shaped slot extending from the opening thereof, the last said beam having a longitudinal marginal edge thereof continuously bridging said opening at said intersection and adjacent said L-shaped slot, said slot being located intermediate said opening and said bridging marginal edge, the other of said beams having a lateral flange bridging the opening in the web thereof and extending through said L-shaped slot.

WILLIAM F. ZABRISKIE.